United States Patent [19]
Lu

[11] Patent Number: 4,858,000
[45] Date of Patent: Aug. 15, 1989

[54] IMAGE RECOGNITION AUDIENCE MEASUREMENT SYSTEM AND METHOD

[75] Inventor: Daozheng Lu, Dunedin, Fla.

[73] Assignee: A. C. Nielsen Company, Northbrook, Ill.

[21] Appl. No.: 244,916

[22] Filed: Sep. 14, 1988

[51] Int. Cl.[4] .................... H04H 9/00; H04N 17/00; G06K 9/00
[52] U.S. Cl. ............................................ 358/84; 382/2
[58] Field of Search ............... 358/84; 379/92; 455/2; 382/2, 19, 23; 340/825.31, 825.34, 825.49

[56] References Cited

U.S. PATENT DOCUMENTS

| | | | |
|---|---|---|---|
| 3,056,135 | 9/1962 | Currey et al. | 358/84 X |
| 3,805,238 | 4/1974 | Rothfjell | 382/2 |
| 4,644,509 | 2/1987 | Kiewit et al. | 358/84 |
| 4,697,209 | 9/1987 | Kiewit et al. | 358/84 |
| 4,712,103 | 12/1987 | Gotanda | 340/825.31 |
| 4,739,398 | 4/1988 | Thomas et al. | 358/84 |
| 4,754,487 | 6/1988 | Newmuis | 382/2 |
| 4,769,697 | 9/1988 | Gilley et al. | 358/84 |

Primary Examiner—Keith E. George
Attorney, Agent, or Firm—Mason, Kolehmainen, Rathburn & Wyss

[57] ABSTRACT

An image recognition method and system are provided for identifying predetermined individual members of a viewing audience in a monitored area. A pattern image signature is stored corresponding to each predetermined individual member of the viewing audience to be identified. An audience scanner includes audience locating circuitry for locating individual audience members in the monitored area. A video image is captured for each of the located individual audience members in the monitored area. A pattern image signature is extracted from the captured image. The extracted pattern image signature is compared with each of the stored pattern image signatures to identify a particular one of the predetermined audience members. These steps are repeated to identify all of the located individual audience members in the monitored area.

27 Claims, 7 Drawing Sheets

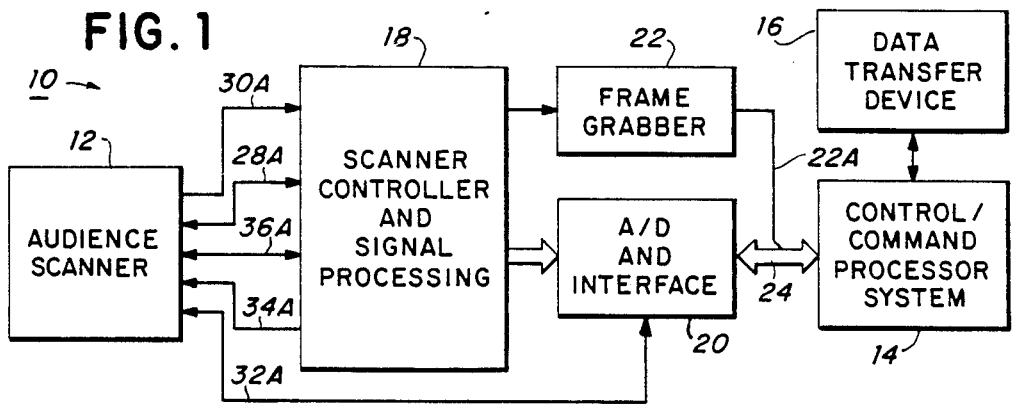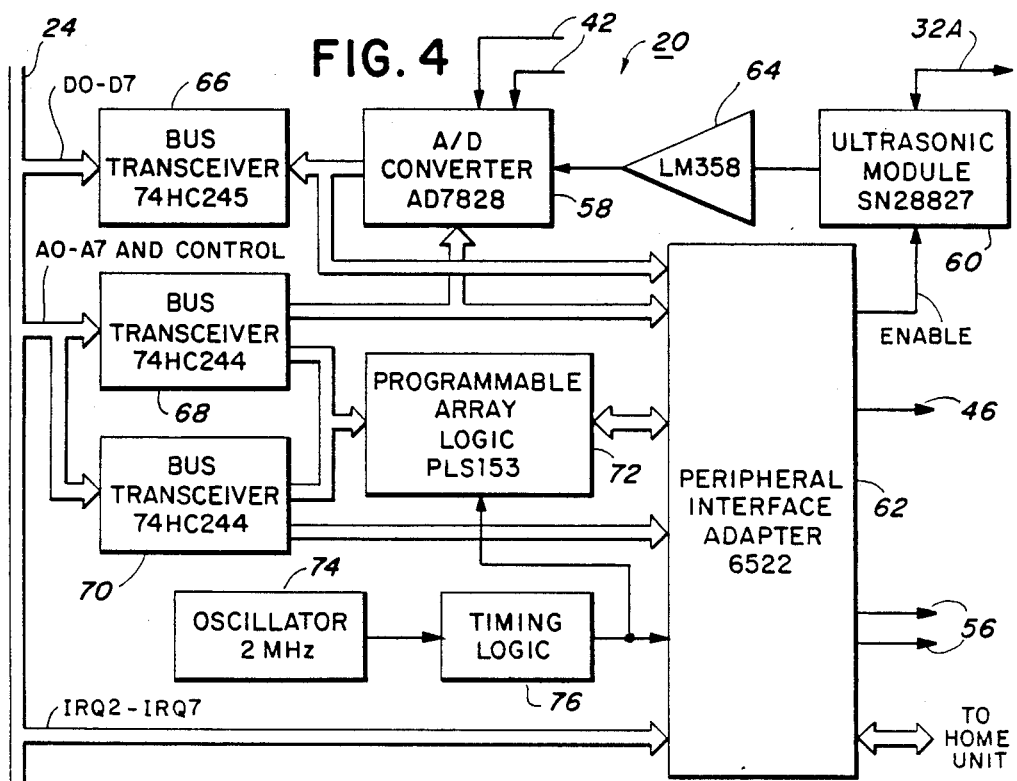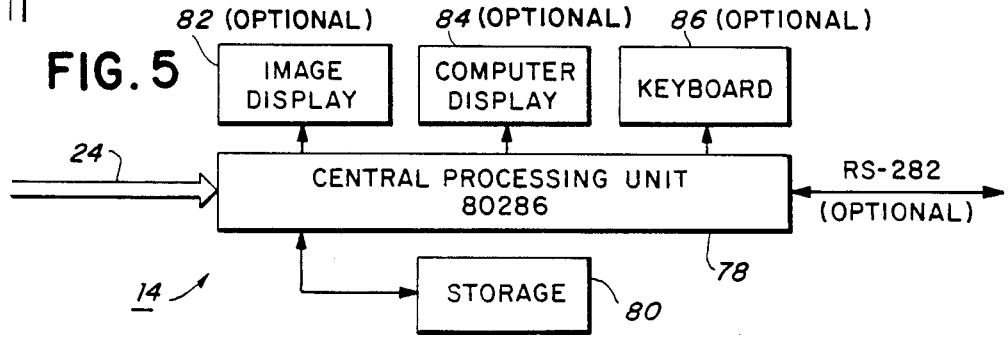

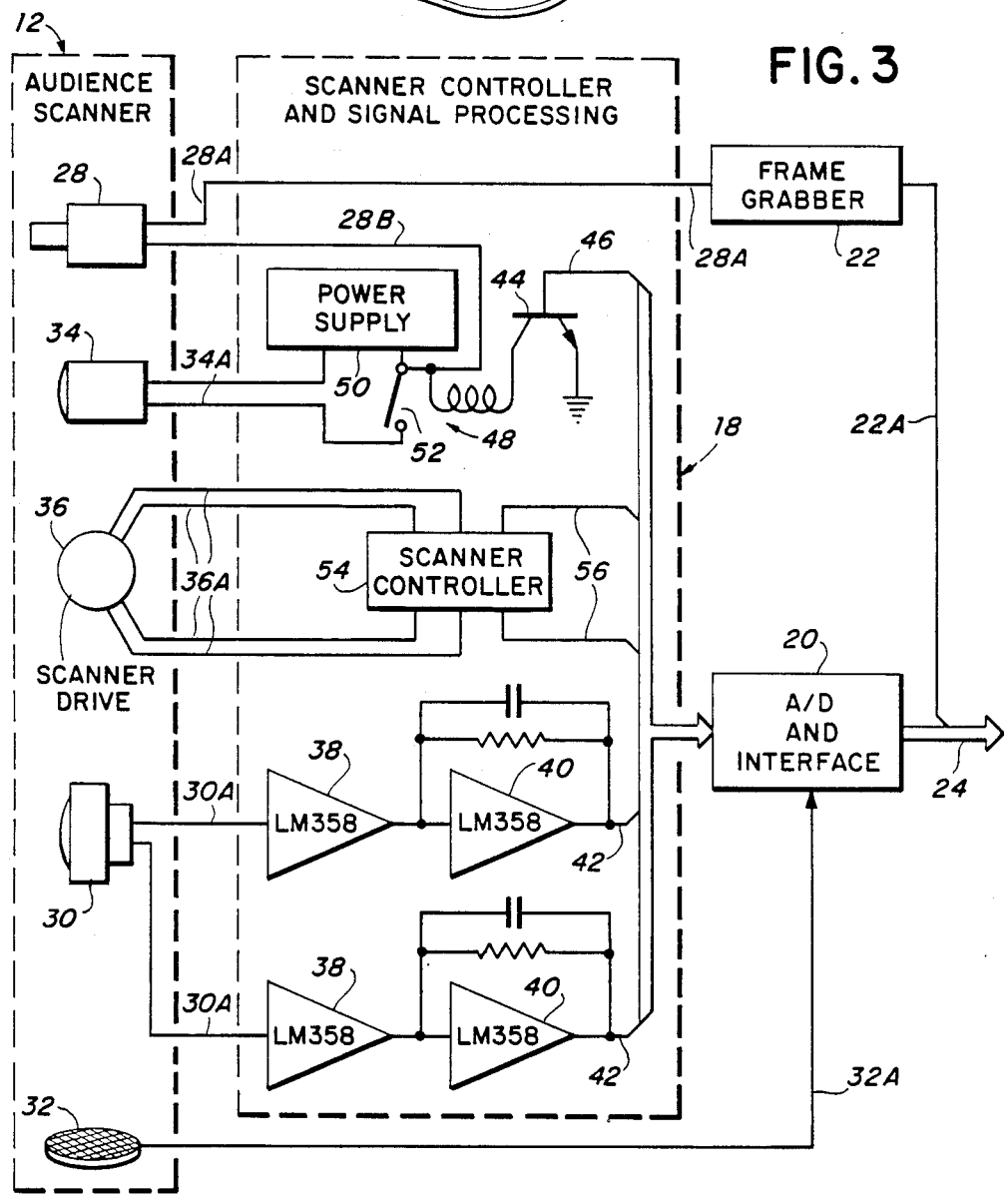

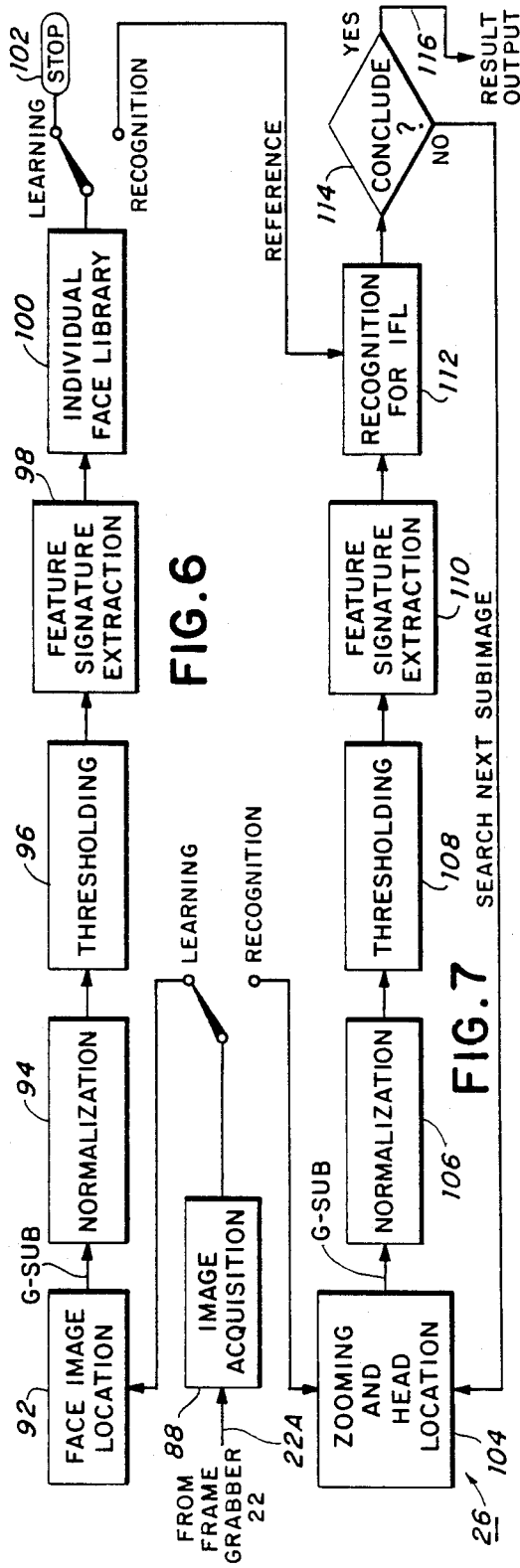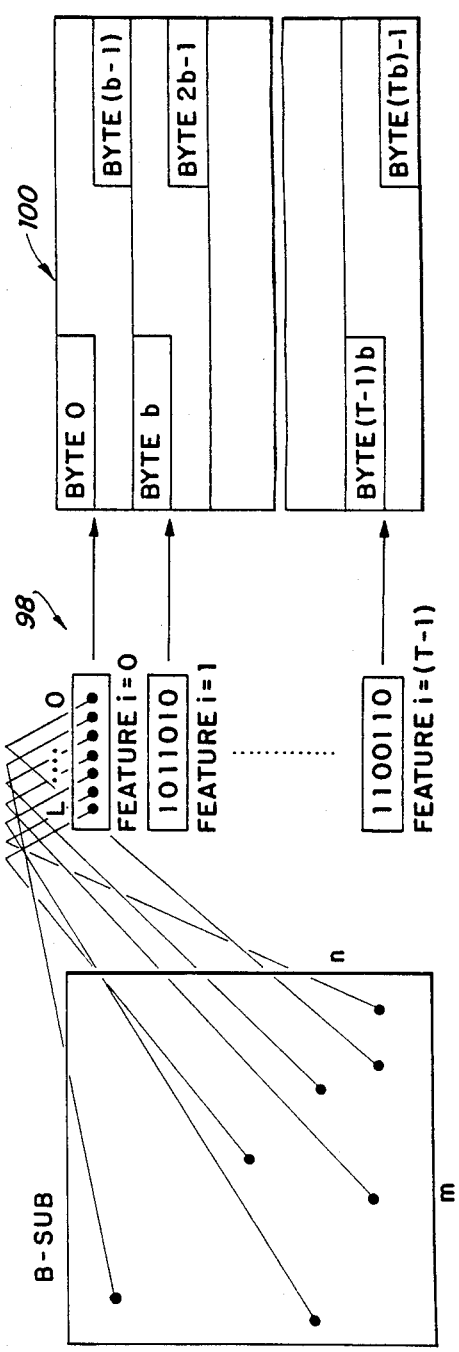

IMAGE RECOGNITION AUDIENCE MEASUREMENT SYSTEM AND METHOD

BACKGROUND OF THE INVENTION

Related Application

A related application is entitled "IMAGE RECOGNITION SYSTEM AND METHOD, Ser. No. 244,492, filed Sept. 14, 1988, the same date as the present application by the present inventor Daozheng Lu and assigned to the same assignee.

A. Field of the Invention

The present invention relates generally to image recognition systems for use with television audience measurement and marketing data collection systems, and more particularly to image recognition systems and methods for identifying predetermined individual members of a viewing audience.

B. Description of the Prior Art

Manual systems for determining the viewing/listening habits of the public are prone to inaccuracies resulting from the entry of erroneous data that may be intentionally or unintentionally entered and are slow in acquiring data.

U.S. Pat. No. 3,056,135 to Currey et al. issued Sept. 25, 1962 and assigned to the same assignee as the present application describes a method and apparatus for automatically determining the listening habits of wave signal receiver users. The method disclosed in Currey et al. provides a record of the number and types of persons sing a wave signal receiver by monitoring the operational conditions of the receiver and utilizing both strategically placed switches for counting the number of persons entering, leaving and within a particular area and a photographic recorder for periodically recording the composition of the audience. A mailable magazine provides a record of both the audience composition and the receiver operation information for manual processing by a survey organization. Thus a disadvantage is that acquiring data is slow and further many viewing audience members object to being identified from the photographic record.

U.S. Pat. No. 4,644,509 to Kiewit et al. issued Feb. 17, 1987 and assigned to the same assignee as the present application discloses an ultrasonic, pulse-echo method and apparatus for determining the number of persons in the audience and the composition of the audience of a radio receiver and/or a television receiver. First and second reflected ultrasonic wave maps of the monitored area are collected, first without people and second with people who may be present in the monitored area. The first collected background defining map is subtracted from the second collected map to obtain a resulting map. The resulting map is processed to identify clusters having a minimum intensity. A cluster size of the thus identified clusters is utilized to identify clusters corresponding to people in an audience. While this arrangement is effective for counting viewing audience members, individual audience members can not be identified.

Various image recognition arrangements and systems are known for recognizing patterns within a captured video image. However, the conventional pattern recognition systems are impractical and uneconomical for identifying individual audience members of a viewing audience due to the vast information storage and computing requirements that would be needed in the conventional systems. It is desirable to provide an image recognition system having the capability to identify individual members of the viewing audience.

SUMMARY OF THE INVENTION

It is an object of the present invention to provide a method and system for determining the viewing habits of the public that overcome many of the disadvantages of the prior art systems.

It is an object of the present invention to provide an image recognition method and system for identifying predetermined individual members of a viewing audience in a monitored area.

It is an object of the present invention to provide an image recognition method and system for identifying predetermined individual members of a viewing audience in a monitored area utilizing both covert illuminators and video sensors.

Therefore, in accordance with a preferred embodiment of the invention, there are provided an image recognition method and system for identifying predetermined individual members of a viewing audience in a monitored area. A pattern image signature is stored corresponding to each predetermined individual member of the viewing, audience to be identified. An audience scanner includes audience locating circuitry for locating individual audience members in the monitored area. A video image is captured for each of the located individual audience members in the monitored area. A pattern image signature is extracted from the captured image. The extracted pattern image signature is compared with each of the stored pattern image signatures to identify a particular one of the predetermined audience members. These steps are repeated to identify all of the located individual audience members in the monitored area.

In accordance with a feature of the invention, each of the plurality of feature image signatures are stored in a distinct memory space of a predetermined capacity. Each of the feature image signatures is generated by processing a plurality of video images of the face of the individual to be identified. A signature from each of the processed video images is extracted and stored in the corresponding predetermined memory space for the particular feature image signature.

DESCRIPTION OF THE DRAWING

These and other objects and advantages of the present invention will become readily apparent upon consideration of the following detailed description and attached drawing wherein:

FIG. 1 is a block diagram of the image recognition system according to the present invention;

FIG. 2 is a perspective view partly broken away to show interior details of an audience scanner of the image recognition system of FIG. 1;

FIG. 3 is a partly schematic and block diagram representation of a scanner controller and signal processing circuit of the image recognition system of FIG. 1;

FIG. 4 is a partly schematic and block diagram representation of an analog-to-digital and interface circuit of the image recognition system of FIG. 1;

FIG. 5 is a block diagram of a control, command processor subsystem of the image recognition system of FIG. 1;

FIG. 6 is a block diagram of a learning functional portion of an audience recognition subsystem of the image recognition system of FIG. 1;

FIG. 6A is a graphical representation of a binary subimage and feature, identifying logic for extracting and storing an image signature of the image recognition system of FIG. 1;

FIG. 7 is a block diagram of a recognition functional portion of the audience recognition subsystem of the image recognition system of FIG. 1;

DETAILED DESCRIPTION OF THE PREFERRED EMBODIMENT

Figure 8A:
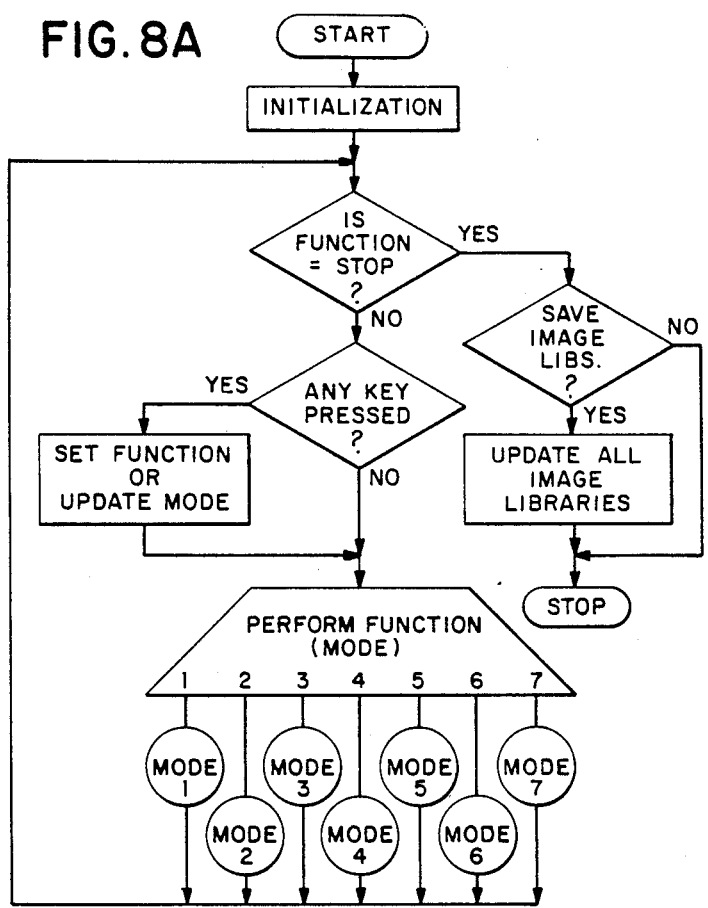
FIGS. 8A–8M are flow charts illustrating the logical steps performed by the image recognition system of FIG. 1.

Referring now to the drawing, with particular attention to FIG. 1, there is illustrated a block diagram of a new and improved image recognition system according to the invention generally designated by the reference numeral 10. While the image recognition system 10 is depicted and generally described herein for use with a television receiver to identify individual members of a viewing audience, the principles of the present invention are also applicable to other image recognition systems.

As its major components, the image recognition system 10 includes an audience scanner 12 for scanning and capturing an image of the viewing audience members within a monitored area, and a control command processor subsystem 14 for performing control operations and for storing and processing captured images. A data transfer device 16 is used for periodically transferring stored data to a central computer (not shown) of the television audience measurement and/or marketing data collection systems. The image recognition system 10 includes a scanner controller and signal processing circuit 18 illustrated in FIG. 3 for providing illumination and motor control signals to the audience scanner 12 and for locating and capturing the images of the audience members within the monitored area, an analog-to-digital A/D and interface circuit 20 illustrated in FIG. 4 for identifying the distance between audience members and the audience scanner 12 and a frame grabber 22 for digitizing video images and providing frame buffer memory, timing and control logic. The frame grabber 22 can be implemented with, for example, such as, a model DT2803 low-cost Frame Grabber for use with IBM personal computers, manufactured and sold by Data Translation Inc., of Marlborough, Mass. The scanner controller and signal processing circuit 18 is connected to the A/D and interface circuit 20 and the frame grabber circuit 22 via a plurality of signal lines and a video cable 28A. A data, address and control bus 24 connects the control command processor subsystem 14 to the A/D and interface circuit 20 and the frame grabber circuit 22. An audience recognition subsystem 26 for learning and for recognizing feature image signatures of the images of the audience members is illustrated in FIGS. 6 and 7.

Referring also to FIGS. 2 and 3, the audience scanner 12 includes a video camera 28 for capturing a video image, a pair of infrared sensors 30 for locating individual audience members, an ultrasound transducer 32 for identifying a distance measurement between the camera 28 and a particular located audience member, a pair of infrared illumination devices 34 for covert illumination of the monitored area, and a scanner drive 36 for scanning the monitored area. The video camera 28 provides a video image signal at a line 28A that is applied to the frame grabber 22. The output of the frame grabber 22 is applied to the data, address and control bus 24 via a line 22A. An infrared video camera, for example, such as a Model CCD1200 IR Microcam, manufactured and sold by Electrophysics Corporation of Nutley, N.J., may be employed for the video camera 28.

A sensed infrared signal at a line 30A provided by the infrared sensors 30 is applied to circuit 18. A parallel opposed dual pyroelectric infrared detector used in conjunction with an optic focusing device including a pair of fixed surface mirrors and a Fresnel lens, may be used for each of the infrared sensors 30, for example, such as an Eltec Model 429 and an Eltec Model 826C manufactured and sold by Eltec Instruments, Inc. of Daytona Beach, Fla. The sensed voltage signal output of each infrared sensor 30 at lines 30A corresponds to the temperature distribution of the monitored area. Each of the sensed infrared signals at lines 30A is applied to one of a pair of preamplifier devices 38. Each amplified infrared signal is applied to a corresponding one of a pair of low pass filters 40 for providing filtered infrared signals at lines 42 applied to the A/D and interface circuit 20. A dual operational amplifier integrated circuit device, such as a device type LM358 arranged with appropriate feedback and biasing devices can be used for the preamplifiers 38 and low pass filters 40.

The ultrasound transducer 32, such as a 50 KHz electrostatic transducer, for transmitting and for receiving ultrasonic signals provides a distance pulse echo signal at a line 32A that is applied to the A/D and interface circuit 20.

Covert illumination of the monitored area is provided by the pair of infrared illumination devices 34 (one shown in FIG. 3) with each illumination device 34 operatively controlled by an activating signal applied at a line 34A. A Model IRL200 infrared room illuminator manufactured and sold by Electrophysics Corporation of Nutley, N.J., may be employed for the illumination devices 34, although various illumination devices such as infrared lasers, light emitting diodes or a filtered flash lamp can be used. A switching transistor 44, such as an NPN bipolar transistor, is turned on by a control signal at a line 46 applied to its base from the A/D and interface circuit 20. A relay 48 connected between the collector of transistor 44 and a power supply 50 is energized by transistor 44 to close its relay contacts 52. The output of the power supply 50 is applied at the line 34A by the closed relay contacts 52. The output of the power supply 50 is connected to the video camera 28 at a line 28B.

The scanner drive 36, such as a stepping motor is operatively controlled by a scanner controller 54 for stepwise angular rotation of the video camera 28 for scanning the monitored area. An integrated circuit stepper motor driver device type SAA1042 manufactured and sold by Motorola Inc. can be employed for the scanner controller 38. Control signals at a pair of lines 56 are applied to the scanner controller 38 from the A/D and interface circuit 20.

FIG. 4 provides a partly schematic and block diagram representation of the A/D and interface circuit 20. The filtered infrared signals at lines 42 are applied to an analog-to-digital A/D converter 58 which generates digital representations of the processed infrared signals. The digitized signals are applied to the control command processor subsystem 14 to identify directions within the monitored area corresponding to the possible locations of individual audience members. An ultrasound range module 60 drives the ultrasound transducer 32 for transmitting an ultrasonic burst signal and for receiving an echo signal at line 32A responsive to an enable or initiate input signal applied by the control/command processor 14 via a peripheral interface adapter (PIA) 62 at a line ENABLE. The control command processor subsystem 14 utilizes the identified angle signal to initiate operation of the ultrasound range module 58.

A peripheral interface adapter device type 6522 manufactured by Rockwell International can be used for the PIA 62. Interrupt control signals IRQ2-IRQ7 at the processor subsystem data, address and control bus 24 from the PIA 62 are applied to the processor subsystem 14. The PIA 62 couples data, timing and control signals between the control/command processor 14 and the scanner controller and signal processing circuit 18. The PIA 62 also enables bidirectional communications between the image recognition system 10 and a host system for a particular application. A home unit of the type as described in U.S. Pat. No. 4,697,209 to David A. Kiewit and Daozheng Lu may be connected to the PIA 62.

An integrated circuit 8-bit A/D converter device type AD7828 manufactured and sold by Analog Devices can be employed for the A/D converter 58. A sonar ranging module, for example, such as an integrated circuit device type SN28827 manufactured and sold by Texas Instruments may be used for the ultrasound range module 60. An output echo signal of the ultrasound range module 60 is coupled to the control/command processor subsystem 14 via an amplifier/limiter stage 64 and the A/D converter 58 which converts the echo signal to a suitable format for use by the control command processor subsystem 14. The processed echo signal representative of distance between the scanner 12 and the located individual audience member is utilized by the control command processor subsystem 14 for adjusting the zooming functions of the video image data during processing.

An octal bus transceiver 66, such as an integrated circuit device type 74HC245 manufactured and sold by Motorola Inc., provides bidirectional data communications between the processor subsystem data, address and control bus 24 and the A/D converter 58. A pair of octal bus transceivers 68 and 70 and a programmable array logic (PLA) device 72 provide bidirectional address and control communications between the processor subsystem data, address and control bus 24 and the PIA 62 and A/D converter 58.

An integrated circuit device type 74HC244 manufactured and sold by Motorola Inc. can be used for each of the octal bus transceivers 68 and 70. An oscillator device 74, such as a 2 MHz oscillator and a timing logic circuit 76 provide timing signals to the PIA 62 and the PLA 72. PLA 72 can be implemented with, for example, an integrated circuit device PLS153 manufactured and sold by Rockwell International.

FIG. 5 provides a block diagram representation of the control command processor subsystem 14 of the image recognition system 10. The control command processor subsystem 14 includes a central processing unit 78, such as, an Intel 80286 high performance 16-bit microprocessor with integrated memory management and adapted for multi-tasking systems and an optional associated memory device 80. The central processing unit 78 is programmable to perform the control and signal processing functions and includes, in known manner, asynchronous input signal timing and clock control bus timing functions.

The control command processor subsystem 14 further may include an image display 82, a computer display 84 and a keyboard 86 for use during the installation of the image recognition system 10. The control command processor subsystem 14 can be implemented with a personal computer system, such as an IBM PC/AT.

Control signals at the processor bus 24 from the central processing unit 78 are applied via the signal line 46 of the PIA 62 (FIG. 4) to the illumination controller switching transistor 44 (FIG. 3) for controlling illumination of the monitored area. Motor control signals at the processor bus 24 from the central processing unit 78 are applied via the lines 56 of the PIA 62 (FIG. 4) to the scanner controller 54 (FIG. 3) which are translated and applied to the stepping motor 36. Feedback position signals may be provided to the central processing unit 78.

FIGS. 6 and 7 provide a block diagram representation of the audience recognition subsystem 26. Bidirectional communications are provided between the central processing unit 78 and the frame grabber 22 and the audience recognition subsystem 26 via the data, address, and control bus 24. Referring initially to FIG. 6, a learning operational mode of the audience recognition subsystem 26 is illustrated. The processed infrared image output signal from the frame grabber 22 is applied to an image acquisition block 88 to generate a digital representation of the infrared image signal. The digital infrared image representation is applied to a face image location block 92 that acquires a variable portion (mxn) pixels of the digitized image signal. The values of m and n are variable between 32 and 256 as determined for a particular identified distance between the scanner 12 and the located audience member. A middle pixel image portion may include, for example, such as m=50 and n=50. A gray-level subimage output of the face image location block 92 at a line G-Sub is applied to a normalization block 94. The normalized output of block 94 is applied to a thresholding block 96 to provide a thresholding, binary level face image output at a line B-Sub. Each pixel of the (mxn) thresholding, binary level face or B-Sub image is represented by a single binary digit or bit, or 2500 bits for the 50×50 pixels. The B-Sub image signal is applied to a feature signature extraction block 98. An extracted pattern image signature output of the feature signature extraction block 98 is stored in an individual face storage library (IFL) 100. A stop function flag is set at stop blocks 102 for updating the image libraries performed by the control command processor subsystem 14 as illustrated in FIG. 8A.

FIG. 6A provides a graphical representation of a B-sub image including mxn pixels. Each of the mxn pixels is either a zero or a one. The B-sub image pixel data is utilized to extract the pattern image signature for storing in the learning operational mode (FIG. 6) and to extract the pattern image signature for comparing with the feature image signatures in the recognition operational mode illustrated in FIG. 7.

In accordance with a feature of the invention, a pseudo random predetermined sequence of the mxn, B-Sub image bits defines a predetermined number T of feature positions used for storing the extracted feature signature output of the feature signature extraction block 98. Each feature position has a predetermined length L, where the value of L is between 3 and 10. Considering a predetermined feature position of length L=7 and with the above example B-Sub image of 2500 bits, a pseudo random sequence of 2500/7 or 357 feature positions results or T=357. Each feature has a value between 0 and ($2^L-1$) or, for example, between 0 and 127 when L=7. A memory space of $2^L$ bits arranged as bytes b, where b equals $2^L/8$, is used for storing the possible feature values for each of the feature positions or, for example, 2*7 or 128 bits or 16 bytes. Thus a total memory space for each of the pattern or face image signatures equals T multiplied by b or, for example, 357 positions×16 bytes/position or 5712 bytes.

FIG. 6A illustrates a plurality of feature positions i=0 through i=(T−1) generally designated by the reference character 98 corresponding to the feature extraction block 98. The corresponding memory space is represented by the reference character 100 corresponding to the IFL block 100. The first or i=0 feature position value is stored in a corresponding bit position B in a corresponding byte between 0 and (b−1) within the memory space 98. The logic steps performed for storing the individual face pattern image signatures are described with respect to FIG. 8B.

A distinct memory space of a predetermined capacity is defined for each of the individual face pattern image signatures within the image face library IFL block 100. For example, for a viewing audience including a defined number of audience members P, individual face signatures (T×P) are stored in the corresponding IFL defined memory spaces. Multiple face images are learned for each of the audience members P by sequentially processing a series of video images of the video camera 28 by the image signal processing blocks of FIG. 6 for each of the audience members. All of the resulting extracted pattern image signatures for each of the audience members are stored in the particular corresponding memory space of the IFL memory spaces.

FIG. 7 provides a block diagram representation of the recognition mode of the audience recognition subsystem 26. The digital representation of the infrared image signal from the image acquisition block 88 corresponding to an identified direction of an audience member by the processor subsystem 14 is applied to a zooming and head location block 104. A gray-level subimage output G-Sub of the zooming and head location block 104 is applied to a normalization block 106. The normalized output of block 106 is applied to a thresholding block 108 to provide a thresholding, binary level image output B-Sub. A feature signature is extracted from the B-Sub image at a feature signature extraction block 110. The extracted B-Sub image feature signature is compared with each of the pattern image signatures stored in the individual face library as illustrated at a block 112 to identify a match. A particular audience member is identified when the compared signatures exceed a predetermined correlation threshold value corresponding to the best matching rate or highest correlation with an individual face pattern image signature in the individual face library is identified at a conclusion block 114. If such a conclusion can not be reached, a next gray-level subimage output G-Sub of the zooming and head location block 104 is sequentially processed until a satisfactory conclusion can be made. The satisfactory conclusions include both "identified" and "unidentified" audience members. The logic steps performed for recognizing the particular individual audience member are described with respect to FIG. 8B. An output signal at a line 116 is then stored corresponding to the particular identified individual member of the viewing audience. The thus identified individual viewing member data can be stored together with other parameter data of a television data collection system, such as channel reception of a monitored receiver.

Referring to FIG. 8A, there is a main flow chart illustrating the logical steps performed by the control command processor subsystem 14 of the image recognition system 10. The sequential steps begin with an initialization routine. Then if a stop function is set, the particular pattern image signature memory space can be updated to include the feature image signature stored at IFL block 100 of FIG. 6. Otherwise, it is determined whether any function or mode has been selected, such as by a remote control or keyboard entry. If yes, then the selected function or mode is set or updated and then performed. Otherwise, the next sequential function or mode of modes 1–7 is performed.

Figure 8C:
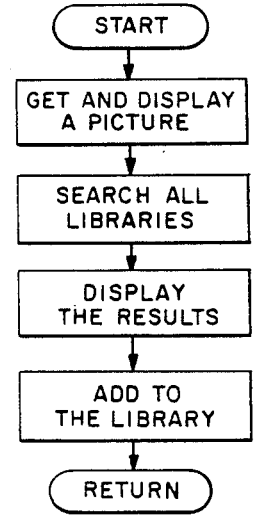
Figure 8D:
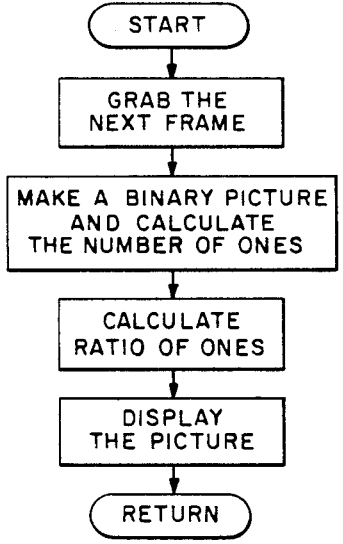
Figure 8G:
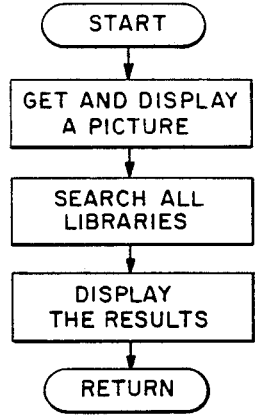
Figure 8F:
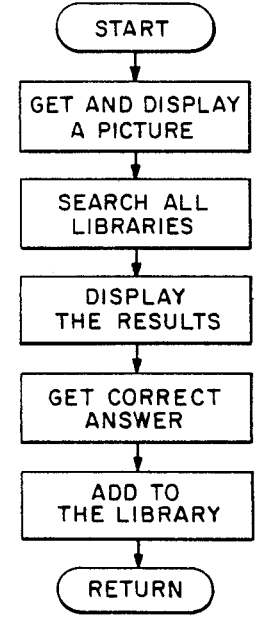
Figure 8E:
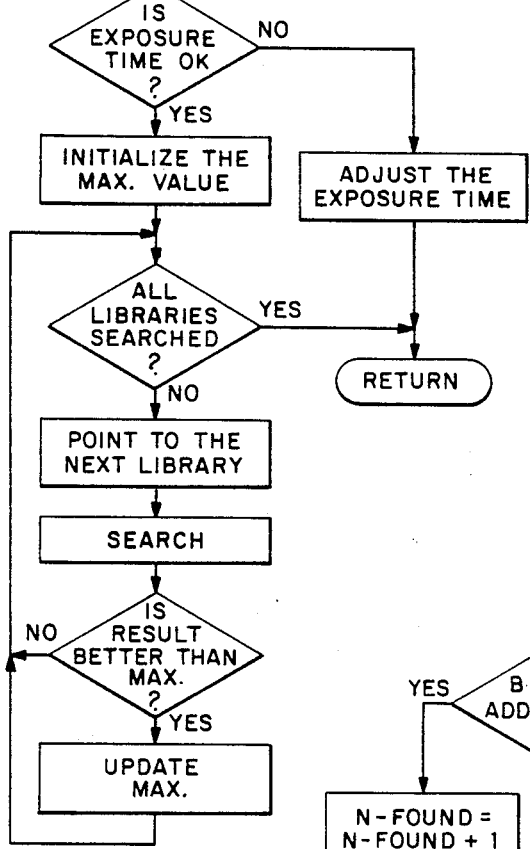
Figure 8B:
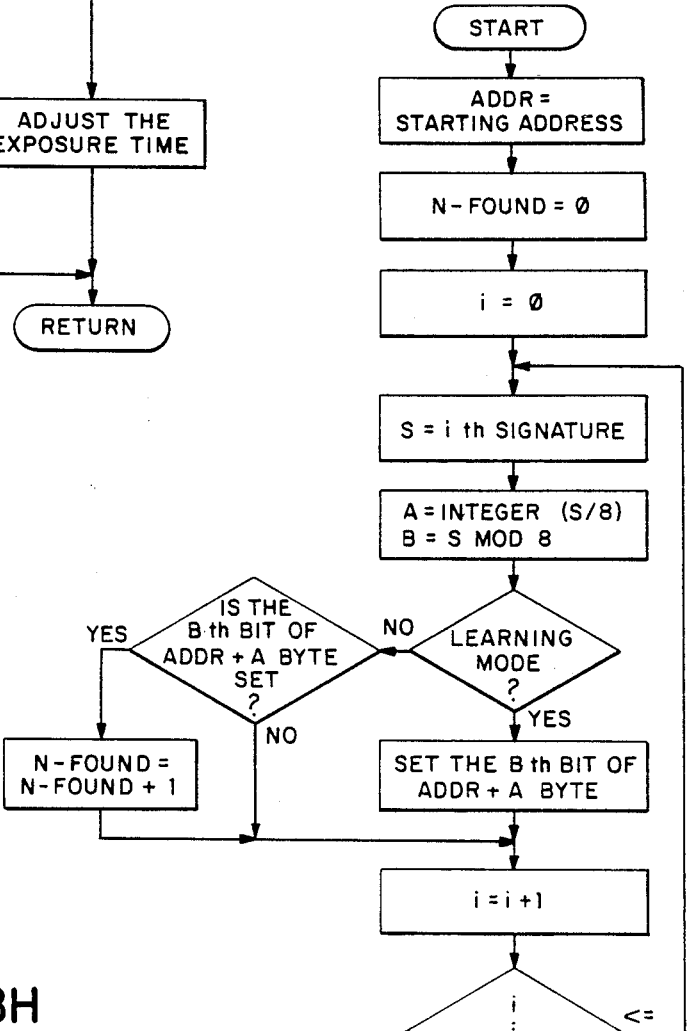

FIG. 8B is a flow chart illustrating the logic steps performed for learning and recognizing the individual face. The sequential operations begin by setting a memory space address ADDR to the starting address with N-found set to zero. In the learning mode, an identified feature value from the B-Sub image is set to a corresponding bit position, starting with feature position i=0 and repeated for each feature position to i=356. The corresponding bit position B bit of ADDR+A byte, is determined by the particular feature value S, where S is between 0 and 127, A equals an integer value S/8 and B equals S mod 8 or the residue of S after A bytes. For example, a feature value S=114 from the B-Sub image for the feature position i=0 is set to the 2nd bit of ADDR+14 byte.

An individual audience member face image may be learned multiple times (R) with R possible different extracted signatures resulting, depending on any changed facial expressions or various profiles of the audience member. Each of the extracted feature signatures is sequentially stored within the corresponding pattern image signature memory space for the particular audience member by repeating the sequential signal processing of FIG. 6 and the learning or storing steps of FIG. 8B.

Otherwise if not in the learning mode, then the sequential steps for the recognition mode are performed, such as at the recognition for IFL block 112 when the B-Sub image extracted feature signature is compared with each of the individual pattern image signatures.

In the recognition mode, the identified feature value from the B-Sub image is compared to a corresponding bit position, starting with feature position i=0 and repeated for each feature position to i=356. If the corresponding bit position is set, a match is indicated and the N-found value is incremented by one. Otherwise, if the corresponding bit position is not set, nonmatching is indicated and the N-found value is not changed. The next incremental feature position is then compared to the corresponding bit position for the identified feature value.

After the last feature position i=356 has been identified and compared to identify a match, then the resulting N-found value is compared with a threshold value. If resulting N-found value is less than the threshold value, then a FALSE or no recognition for the particular IFL is indicated. If resulting N-found value is greater than or equal to the threshold value, then a TRUE or a recognition of the particular IFL is indicated.

FIG. 8C is a flow chart illustrating an operational function or mode 1 logical steps performed to add to the individual pattern image signatures memory space or library. The sequential steps begin with a get and display a picture subroutine illustrated in FIG. 8D. Next a search all libraries subroutine illustrated in FIG. 8E is performed. The results are displayed and added to the library.

The get and display a picture subroutine of FIG. 8D starts with an image acquisition step (block 88 of FIG. 6). The infrared video image is processed (blocks 92, 94 and 96 of FIG. 6) to provide a binary picture (B-sub image). A ratio of the ones in the resulting binary picture is calculated and the resulting binary picture is displayed.

In FIG. 8E, the search all libraries subroutine begins with a check of the exposure time based on the calculated ratio of ones and if adjustment is required, then the sequential operation return without searching the libraries. Otherwise, if adjustment of the exposure time is not required, then an initial MAX value is set for the predetermined N-found value. A first library is searched (block 112 of FIG. 7 and FIG. 8B) and if the result N-found value is greater than the initial MAX value, then the MAX value is updated. Otherwise the MAX value is not changed. Then a next library is searched and the result is compared to the resulting MAX value and adjusted, until all the libraries have been searched.

FIG. 8F is a flow chart illustrating an operational function or mode 2 logical steps performed to verify and add to library. The sequential steps begin with the get and display the picture subroutine illustrated in FIG. 8D. Next the search all libraries subroutine illustrated in FIG. 8E is performed. The results are displayed, verified by a user operator of the system 10, then added to an identified correct library.

FIG. 8G is a flow chart illustrating an operational function or mode 3 logical steps performed to locate, display and recognize the faces. The sequential steps begin with a get and display the picture subroutine illustrated in FIG. 8D. Next the search all libraries subroutine illustrated in FIG. 8E is performed. The results are displayed.

Figure 8H:
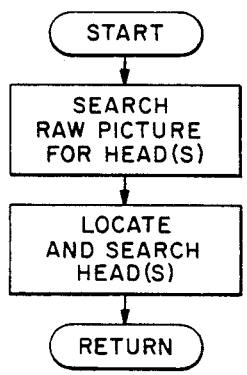

FIG. 8H is a flow chart illustrating an operational function or mode 4 logical steps performed to locate the faces. The sequential steps begin with a search raw picture for heads subroutine illustrated in FIG. 8I. Next a locate and search head(s) subroutine illustrated in FIG. 8J is performed.

Figure 8I:
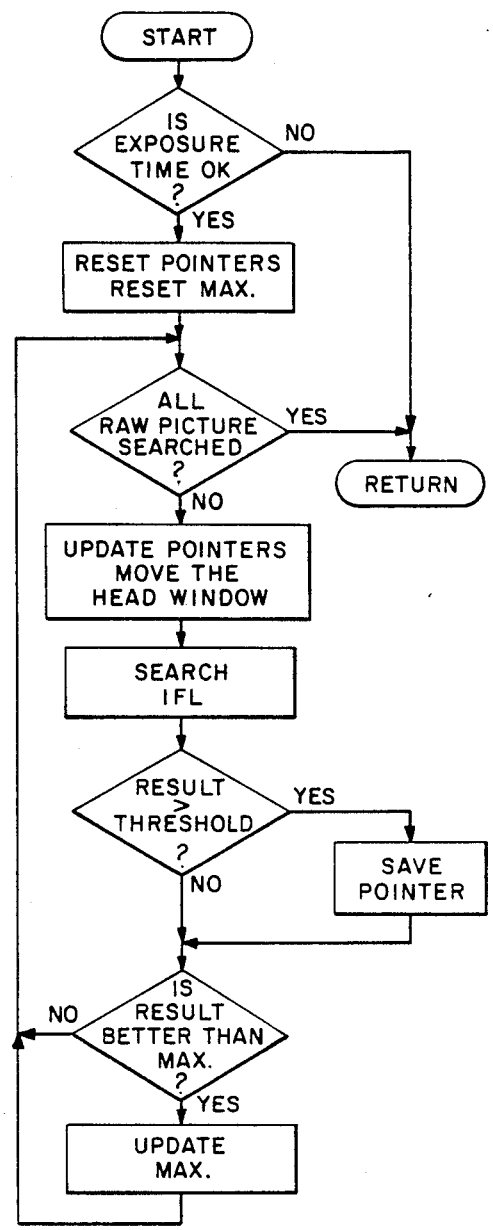

In FIG. 8I, the search raw picture for head(s) subroutine begins with a check of the exposure time and if adjustment is required, then the sequential operation return without performing any searching for heads. Otherwise, if adjustment of the exposure time is not required, then an initial MAX value is set for the predetermined N-found value and a search area pointer i is reset. The first search area matrix is identified and sequentially compared with each of the individual pattern image signatures (IFM block 112 of FIG. 7 and FIG. 8B). The result is compared with the set predetermined correlation threshold MAX value, and if the result is greater than the initial MAX value, then that search area pointer is saved and the MAX value is updated. Otherwise, the search area pointer is not saved and the MAX value is not changed. Then the search area pointer value is updated and the next search area matrix is identified and the sequential steps are repeated until the total raw picture has been searched.

Figure 8L:
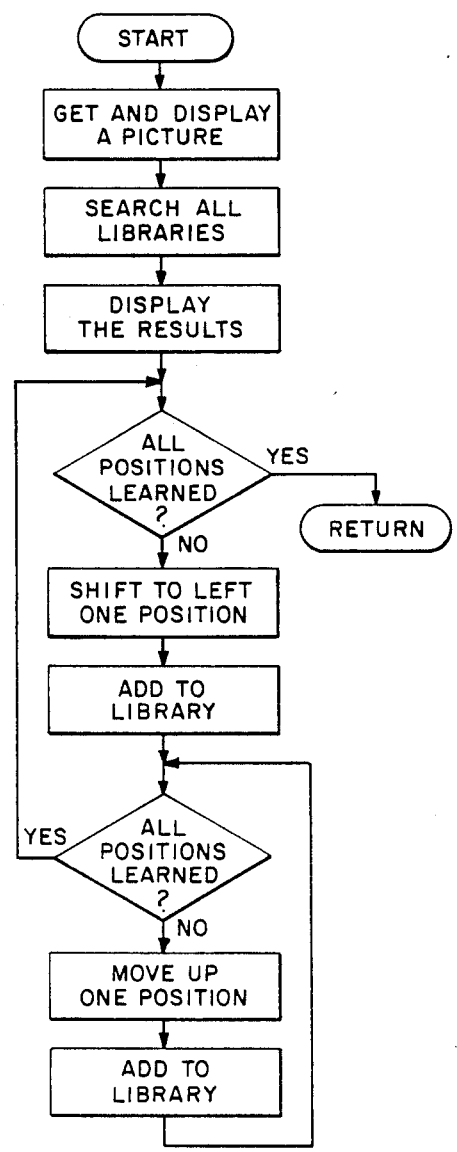
Figure 8J:
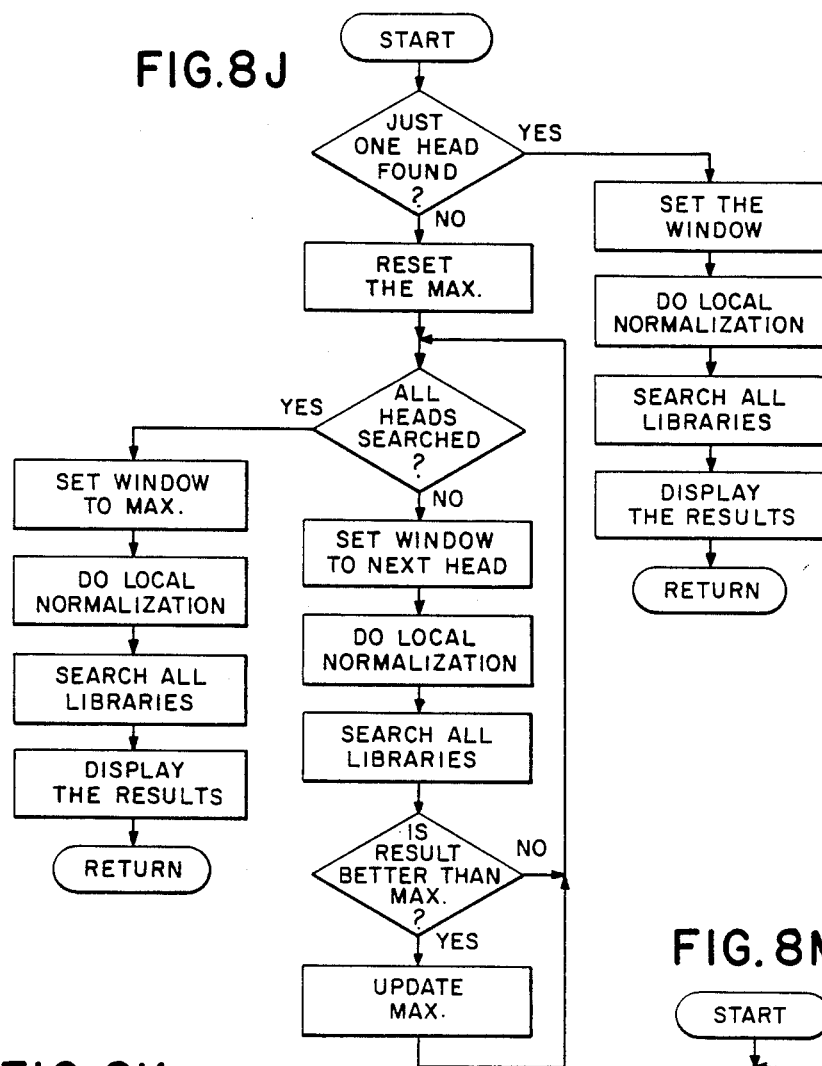

FIG. 8J illustrates the locate and search head(s) subroutine performed by the control command processor subsystem 14 in the mode 4. If one search area pointer is stored in the subroutine of FIG. 8I, then the search area window is set to the identified search area matrix by the saved pointer value which corresponds to the head image portion. The exposure time is adjusted and the search all libraries subroutine of FIG. 8E is performed and the results are displayed.

Otherwise, if more than one pointer value is stored in the subroutine of FIG. 8I, then the MAX value is reset for a predetermined initial value. Then the search area window is set to the first identified search area matrix by the first saved pointer value which corresponds to a first head image portion. A local normalization is performed on the search area matrix data and the search all libraries subroutine of FIG. 8E is performed, and if the result is greater than the initial MAX value, then the MAX value is updated. Otherwise the MAX value is not changed. Then a next search area window is set to the next saved pointer value which corresponds to a next head image portion and the sequential steps are repeated until all the head image portions have been searched. Then the search area window is set to the identified search area matrix having the highest MAX value which corresponds to the head image portion. A local normalization is performed on the search area matrix data and the search all libraries subroutine of FIG. 8E is performed and the results are displayed.

Figure 8K:
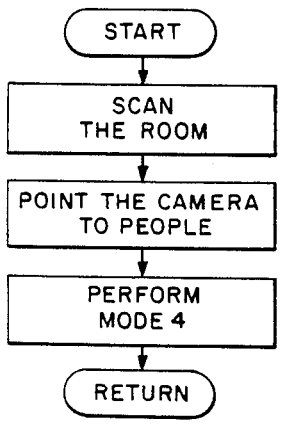

FIG. 8K is a flow chart illustrating an operational function or mode 5 logical steps performed to scan and search the monitored area. The sequential steps begin with scanning of the monitored area. Then the video camera 28 is pointed to audience members within the monitored area and the mode 4 operations of FIG. 8H are performed.

FIG. 8L is a flow chart illustrating an operational function or mode 6 logical steps performed to shift and learn. The sequential steps begin with the get and display the picture subroutine illustrated in FIG. 8D. Next the search all libraries subroutine illustrated in FIG. 8E is performed. The results are displayed and if all positions have been learned, then the sequential operation return without adding to the library. Otherwise, the audience member image is shifted to the left one position and added to the pattern image signature IFL. Then the audience member image is moved up one position and sequentially repeated until all positions have been learned and added to the library.

Figure 8M:
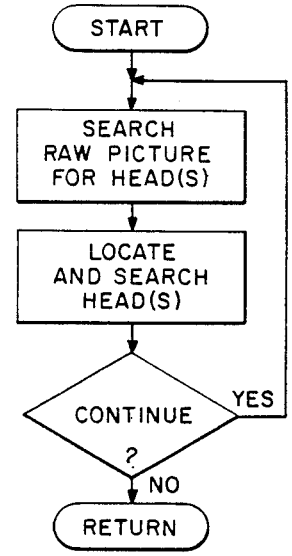

FIG. 8M is a flow chart illustrating an operational function or mode 7 logical steps performed to search and pause. The sequential steps begin with the search raw picture for heads subroutine illustrated in FIG. 8I. Next the locate and search head(s) subroutine illustrated in FIG. 8J is performed. Then if a continue decision is yes, the sequential mode 7 steps are repeated.

Although the present invention has been described in connection with details of the preferred embodiment, many alterations and modifications may be made, without departing from the invention. Accordingly, it is intended that all such alterations and modifications be considered as within the spirit and scope of the invention as defined in the appended claims.

What is claimed and desired to be secured by Letters Patent is:

1. An image recognition system for identifying predetermined individual members of a viewing audience in a monitored area:
 - means for storing a plurality of pattern image signatures, each of said pattern image signatures corresponding to one of the predetermined individual members;
 - means for locating individual members in the monitored area;
 - means for capturing an image of each of said located individual members in the monitored area;
 - means for comparing each of said captured images with said stored pattern image signatures to identify each of the predetermined individual members.

2. An image recognition system as recited in claim 1 wherein said means for locating the individual members includes an infrared detector for providing a temperature representative signal of the monitored area.

3. An image recognition system as recited in claim 2 further comprising processing means for processing said temperature representative signal to provide a direction signal.

4. An image recognition system as recited in claim 3 wherein said means for locating the individual members further includes ultrasonic means responsive to said direction signal for providing a distance signal.

5. An image recognition system as recited in claim 4 wherein said ultrasonic means include means for transmitting an ultrasonic pulse echo signal, means for detecting a reflected pulse echo signal, and means for processing said detected pulse echo signal for providing said distance signal.

6. An image recognition system as recited in claim 2 wherein said means for locating the individual members further includes scanner means for scanning the monitored area providing angular rotation of said infrared detector in a plane to provide said temperature representative signal of the monitored area.

7. An image recognition system as recited in claim 1 wherein said image capturing means includes an infrared video camera for providing a video image signal.

8. An image recognition system as recited in claim 7 wherein said comparing means includes:
 - means for processing each said captured video image to provide a digitized image signal; and
 - means for extracting a pattern signature from said digitized image signal.

9. An image recognition system as recited in claim 8 wherein said digitized image signal comprises a digitized gray level image.

10. An image recognition system as recited in claim 8 wherein said digitized image signal comprises a thresholding binary image.

11. An image recognition system as recited in claim 8 wherein said pattern signature extracting means includes:
 - means for defining a plurality of predefined feature positions from said digitized image signal;
 - means for identifying a feature value for each of said plurality of predefined feature positions; and
 - means for identifying a memory location corresponding to said identified feature value for each of a plurality of predefined feature positions.

12. An image recognition system as recited in claim 11 wherein said comparing means further includes:
 - means for calculating a number of matching memory locations with each of said pattern image signatures; and
 - means for identifying a match responsive to said calculated number greater than a predetermined threshold value.

13. An image recognition system as recited in claim 12 wherein said comparing means further includes:
 - means for identifying a highest matching value to identify each of the predetermined audience members.

14. An image recognition system as recited in claim 1 further comprising covert illumination means for illuminating the monitored area.

15. An image recognition system as recited in claim 14 wherein said covert illumination means include at least one infrared illuminator.

16. A method of identifying predetermined individual members of a viewing audience in a monitored area:
 - storing a plurality of pattern image signatures, each of said pattern image signatures corresponding to one of the predetermined individual members;
 - scanning the monitored area and generating a temperature representative signal of the monitored area;
 - processing said generated temperature representative signal and providing individual members direction signals;
 - capturing a video image responsive to each of said individual members direction signals in the monitored area;
 - sequentially comparing each said captured video image with each of said stored pattern image signatures to identify each of the predetermined individual members.

17. A method as recited in claim 16 wherein said step of sequentially comparing includes the steps of:
 - processing each said captured video image to provide a digitized image signal;
 - extracting a pattern image signature from each said digitized image; and
 - comparing each said extracted signature with each of said stored pattern image signatures.

18. A method as recited in claim 17 wherein said steps of extracting and comparing said extracted signature includes the steps of:
 - identifying a feature value for each of a plurality of predefined feature positions from said digitized image signal;
 - identifying and comparing a memory location corresponding to said identified feature value for each of said plurality of predefined feature positions with each of said stored pattern image signatures;
 - calculating the number of matching memory locations for each of said stored pattern image signatures; and
 - identifying a match responsive to said calculated number greater than a predetermined threshold value.

19. A method as recited in claim 18 further comprising the step of identifying a highest matching value of said identified matching signatures to identify each of the predetermined individual members.

20. A method as recited in claim 16 wherein said steps of storing said plurality of pattern image signatures includes the steps of:
 - providing a plurality of distinct pattern image signature memory spaces for storing each of said pattern image signatures;
 - capturing a first video image of each of the predetermined individual members;

sequentially processing each said first captured video image to provide a digitized image signal;

identifying a feature value from each said digitized image signal for each of a plurality of predefined feature positions;

identifying a memory location corresponding to each said identified feature value for each of a plurality of predefined feature positions; and storing a binary digit one in said identified memory locations in the pattern image signature memory space corresponding to a sequential one of the predetermined individual members.

21. A method as recited in claim 20 further comprising capturing at least one subsequent video image of each predetermined individual member and sequentially repeating the processing, identifying and storing steps for each captured video image.

22. An image recognition system for identifying predetermined individual members of a viewing audience in a monitored area:

memory means for storing a plurality of pattern image signatures, each of said pattern image signatures corresponding to one of the predetermined individual members;

scanner means for scanning the monitored area;

infrared sensing means carried by said scanner for providing a temperature representative signal of the monitored area;

means responsive to said temperature representative signal for generating a direction signal for each located individual member in the monitored area;

infrared video camera means carried by said scanner means and responsive to said direction signal for capturing an image of each of said located individual members in the monitored area;

means for comparing each said captured image with said stored pattern image signatures to identify each of said located individual members of the predetermined individual members.

23. An image recognition system as recited in claim 22 further comprising:

ultrasonic detecting means carried by said scanner means and responsive to said direction signal for each located individual member for transmitting an ultrasonic pulse signal and for detecting a reflected ultrasonic echo signal;

means responsive to said detected ultrasonic echo signal for generating a distance signal; and wherein said infrared video camera means is responsive to said distance signal for capturing said image of each of said located individual members in the monitored area.

24. An image recognition system as recited in claim 22 further comprising:

infrared illumination means carried by said scanner means and responsive to said direction signal for illuminating said located individual member in the monitored area.

25. An image recognition system as recited in claim 22 wherein said comparing means includes:

means for processing said captured video image to provide a digitized image signal; and means for extracting a pattern signature from said digitized image signal.

26. An image recognition system as recited in claim 25 wherein said pattern signature extracting means includes:

means for defining a plurality of predefined feature positions from said digitized image signal;

means for identifying a feature value for each of said plurality of predefined feature positions; and means for identifying a memory location corresponding to said identified feature value for each of a plurality of predefined feature positions.

27. An image recognition system as recited in claim 26 further includes:

means for sequentially comparing said identified memory locations with each of said stored pattern image signatures;

means for calculating a number of matching memory locations with each of said pattern image signatures; and means for identifying a match responsive to said calculated number greater than a predetermined threshold value.

* * * * *